(12) United States Patent
Varekamp et al.

(10) Patent No.: US 12,026,903 B2
(45) Date of Patent: Jul. 2, 2024

(54) PROCESSING OF DEPTH MAPS FOR IMAGES

(71) Applicant: KONINKLIJKE PHILIPS N.V., Eindhoven (NL)

(72) Inventors: Christiaan Varekamp, Veldhoven (NL); Bartholomeus Wilhelmus Damianus Van Geest, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 354 days.

(21) Appl. No.: 17/436,097

(22) PCT Filed: Mar. 3, 2020

(86) PCT No.: PCT/EP2020/055565
§ 371 (c)(1),
(2) Date: Sep. 3, 2021

(87) PCT Pub. No.: WO2020/178289
PCT Pub. Date: Sep. 10, 2020

(65) Prior Publication Data
US 2022/0148207 A1 May 12, 2022

(30) Foreign Application Priority Data
Mar. 5, 2019 (EP) ..................... 19160805

(51) Int. Cl.
*G06T 7/55* (2017.01)
*G06T 7/70* (2017.01)
(52) U.S. Cl.
CPC ............... *G06T 7/55* (2017.01); *G06T 7/70* (2017.01); *G06T 2207/10028* (2013.01)

(58) Field of Classification Search
CPC ............ G06T 2207/10012–2207/10028; G06T 7/80–7/97; G06T 7/55; G06T 7/70;
(Continued)

(56) References Cited

U.S. PATENT DOCUMENTS 11,615,546 B2* 3/2023 Venkataraman ......... G06N 3/08
382/100
2012/0274626 A1* 11/2012 Hsieh .................. H04N 13/111
345/419

(Continued)

OTHER PUBLICATIONS

Yang, Y., Liu, Q., He, X., & Liu, Z. (2018). Cross-view multi-lateral filter for compressed multi-view depth video. IEEE Transactions on Image Processing, 28(1), 302-315. (Year: 2018).*

(Continued)

*Primary Examiner* — Andrae S Allison
*Assistant Examiner* — Emmanuel Silva-Avina

(57) ABSTRACT

A method of processing depth maps comprises receiving (301) images and corresponding depth maps. The depth values of a first depth map of the corresponding depth maps are updated (303) based on depth values of at least a second depth map of the corresponding depth maps. The updating is based on a weighted combination of candidate depth values determined from other maps. A weight for a candidate depth value from the second depth map is determined based on the similarity between a pixel value in the first image corresponding to the depth being updated and a pixel value in a third image at a position determined by projecting the position of the depth value being updated to the third image using the candidate depth value. More consistent depth maps may be generated in this way.

20 Claims, 7 Drawing Sheets

(58) Field of Classification Search
CPC . G06T 2207/20012; G06T 2207/20221; G06T 5/50
USPC ......................................................... 382/154
See application file for complete search history.

(56) References Cited

U.S. PATENT DOCUMENTS

| | | | |
|---|---|---|---|
| 2015/0049915 A1* | 2/2015 | Ciurea .................... | G06T 7/593 382/106 |
| 2015/0269736 A1* | 9/2015 | Hannuksela ......... | H04N 13/161 345/419 |
| 2017/0316602 A1* | 11/2017 | Smirnov .............. | H04N 13/189 |
| 2022/0006996 A1* | 1/2022 | Boissonade .......... | H04N 13/282 |

OTHER PUBLICATIONS

Wolff, K., Kim, C., Zimmer, H., Schroers, C., Botsch, M., Sorkine-Hornung, O., & Sorkine-Hornung, A. (Oct. 2016). Point cloud noise and outlier removal for image-based 3D reconstruction. In 2016 Fourth International Conference on 3D Vision (3DV) (pp. 118-127). IEEE. (Year: 2016).*

You Yang et al "Cross-view Multi-Lateral Filter for Compressed Multiview Depth Video" IEEE Transactions on Image Processing, vol. 28, No. 1, Jan. 1, 2019 p. 302-315.

Wolf Katja et al "Point Cloud Noise and Outlier Removal for Image Based 3d Reconstruction" 2016 Fourth International Conf. on 3D Vision, IEEE Oct. 25, 2016 p. 118-127.

International Search Report and Written Opinion from PCT/EP2020/055565 dated Sep. 10, 2020.

\* cited by examiner

PROCESSING OF DEPTH MAPS FOR IMAGES

CROSS-REFERENCE TO PRIOR APPLICATIONS

This application is the U.S. National Phase application under 35 U.S.C. § 371 of International Application No. PCT/EP2020/055565, filed on Mar. 3, 2020, which claims the benefit of EP Patent Application No. EP 19160805.8, filed on Mar. 5, 2019. These applications are hereby incorporated by reference herein.

FIELD OF THE INVENTION

The invention relates to processing of depth maps for images and in particular, but not exclusively, to processing of depth maps supporting view synthesis for a virtual reality application.

BACKGROUND OF THE INVENTION

The variety and range of image and video applications have increased substantially in recent years with new services and ways of utilizing and consuming video being continuously developed and introduced.

For example, one service being increasingly popular is the provision of image sequences in such a way that the viewer is able to actively and dynamically interact with the system to change parameters of the rendering. A very appealing feature in many applications is the ability to change the effective viewing position and viewing direction of the viewer, such as for example allowing the viewer to move and "look around" in the scene being presented.

Such a feature can specifically allow a virtual reality experience to be provided to a user. This may allow the user to e.g. (relatively) freely move about in a virtual environment and dynamically change his position and where he is looking. Typically, such virtual reality applications are based on a three-dimensional model of the scene with the model being dynamically evaluated to provide the specific requested view. This approach is well known from e.g. game applications, such as in the category of first person shooters, for computers and consoles.

It is also desirable, in particular for virtual reality applications, that the image being presented is a three-dimensional image. Indeed, in order to optimize immersion of the viewer, it is typically preferred for the user to experience the presented scene as a three-dimensional scene. Indeed, a virtual reality experience should preferably allow a user to select his/her own position, camera viewpoint, and moment in time relative to a virtual world.

Many virtual reality applications are based on a predetermined model of the scene, and typically on an artificial model of a virtual world. It is often desirable for a virtual reality experience to be provided based on real world capture.

In many systems, such as specifically when based on a real world scene, an image representation of the scene is provided where the image representation includes images and depth for one or more capture points/view points in the scene. Image plus depth representation provides a very efficient characterization of, in particular, a real world scene where the characterization is not only relatively easy to generate by capture of the real world scene but is also highly suitable for a renderer synthesizing views for other viewpoints than those captured. For example, a renderer may be arranged to dynamically generate views that match a current local viewer pose. E.g., a viewer pose may dynamically be determined, and views dynamically generated to match this viewer pose based on the images and e.g. depth maps provided.

In many practical systems, a calibrated multi-view camera rig may be used to allow playback for a user that takes different perspectives relative to the captured scene. Applications include selecting an individual viewpoint during a sports match, or playback of a captured 3D scene on an augmented- or virtual-reality headset.

You Yang ET AL discloses in "Cross-View Multi-Lateral Filter for Compressed Multi View Depth Video", IEEE TRANSACTIONS ON IMAGE PROCESSING, vol. 28, no. 1, 1 Jan. 2019 (2019 Jan. 1), pages 302-315, XP055614403, US ISSN: 1057-7149, DOI: 10.1109/TIP.2018.2867740" a cross-view multilateral filtering scheme to improve the quality of compressed depth maps/videos within the framework of asymmetric multiview video with depth compression. Through this scheme, a distorted depth map is enhanced via non-local candidates selected from current and neighboring viewpoints of different time-slots. Specifically, these candidates are clustered into a macro super pixel denoting the physical and semantic cross-relationships of the cross-view, spatial and temporal priors.

WOLFF KATJA ET AL discloses in "Point Cloud Noise and Outlier Removal for ImageBased 3D Reconstruction, 2016 FOURTH INTERNATIONAL CONFERENCE ON 3D VISION (3DV), IEEE, 25 Oct. 2016 (2016 Oct. 25), pages 118-127, XP033027617, DOI: 10.1109/3DV.2016.20" an algorithm using input images and corresponding depth maps to remove pixels which are geometrically or photometricaily inconsistent with the colored surface implied by the input. This allows standard surface reconstruction methods to perform less smoothing and thus achieve higher quality.

In order to provide a smooth transition between the discrete captured view-points, and some extrapolation beyond the captured view-points, depth maps are often provided and used to predict/synthesize the view from these other viewpoints.

Depth maps are typically generated using (multi-view) stereo matching between captured cameras or more directly by using depth sensors (structured light or time-of-flight based). However, such depth maps obtained from a depth sensor or a disparity estimation process inherently have errors and inaccuracies that may result in errors in the synthesized views. This degrades the experience of the viewer.

Hence, an improved approach for generating and processing depth maps would be advantageous. In particular, a system and/or approach that allows improved operation, increased flexibility, an improved virtual reality experience, reduced complexity, facilitated implementation, improved depth maps, increased synthesized image quality, improved rendering, an improved user experience and/or improved performance and/or operation would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a method of processing depth maps, the method comprising: receiving a plurality of images and corresponding depth maps representing a scene from different view poses; updating depth values of a first depth map of the corresponding depth maps based on depth values of at least a second depth map of the corresponding depth maps, the first depth map being for a first image and the second depth map being for a second image; the updating comprising: determining a first candidate depth value for a first depth pixel of the first depth map at a first depth map position in the first depth map, the first candidate depth value being determined in response to at least one second depth value of a second depth pixel of the second depth map at a second depth map position in the second depth map; determining a first depth value for the first depth pixel by a weighted combination of a plurality of candidate depth values for the first depth map position, the weighted combination including the first candidate depth value weighted by a first weight; wherein determining the first depth value comprises: determining a first image position in the first image for the first depth map position, determining a third image position in a third image of the plurality of images, the third image position corresponding to a projection of the first image position to the third image based on the first candidate depth value; determining a first match error indication indicative of a difference between an image pixel value in the third image for the third image position and an image pixel value in the first image for the first image position, and determining the first weight in response to the first match error indication.

The approach may provide an improved depth map in many embodiments and may in particular provide set of depth maps with increased consistency. The approach may allow improved view consistency when images are synthesized based on the images and updated depth maps.

The Inventors have had the insight that inconsistencies between depth maps may often be more perceivable than errors or noise that is consistent between depth maps, and that the specific approach may provide more consistent updated depth maps. The method may be used as a depth refinement algorithm that improves the quality of depth maps for a set of multi-view images of a scene.

The approach may facilitate implementation in many embodiments, and may be implemented with relatively low complexity and resource requirements.

A position in an image may directly correspond to a position in the corresponding depth map, and vice versa. There may be a one to one correspondence between a position in an image and a position in the corresponding depth map. In many embodiments, the pixel positions may be the same in the image and corresponding depth maps, and the corresponding depth map may comprise one pixel for each pixel in the image.

In some embodiments, the weights may be binary (e.g. one or zero) and the weighted combination may be a selection.

It will be appreciated that the term projection may often refer to projection of three dimensional spatial coordinates in the scene to two dimensional image coordinates (u,v) in an image or depth map. However, projection may also refer to a mapping between dimensional image coordinates (u,v) for a scene point from one image or depth map to another, i.e. from one set of image coordinates $(u_1,v_1)$ for one pose to another set of image coordinates $(u_2,v_2)$ for another pose. Such projection between image coordinates for images corresponding to different view poses/positions is typically performed considering the corresponding spatial scene point, and specifically by considering the depth of the scene point.

In some embodiments, determining the first depth value comprises: projecting the first depth map position to a third depth map position in a third depth map of the corresponding depth maps, the third depth map being for a third image and the projecting being based on the first candidate depth value, determining a first match error indication indicative of a difference between an image pixel value in the third image for the third depth map position and an image pixel value in the first image for the first depth map position, and determining the first weight in response to the first match error indication.

In accordance with an optional feature of the invention, determining a first candidate depth value comprises determining the second depth map position relative to the first depth map position by a projection between a first view pose of the first image and a second view pose of the second image based on at least one of the second value and a first original depth value of the first depth map.

This may provide particularly advantageous performance in many embodiments, and may specifically allow improved depth maps with improved consistency in many scenarios.

The projection may be from the second depth map position to the first depth map position, and thus from the second view pose to the first view pose, based on the first original depth value.

The projection may be from the second depth map position to the first depth map position, and thus from the second view pose to the first view pose, based on the second depth value.

The original depth value may be a non-updated depth value of the first depth map.

The original depth value may be a depth value of the first depth map as received by the receiver.

In some embodiments determining the first depth value comprises: projecting the first depth map position to a third depth map position in a third depth map of the corresponding depth maps, the third depth map being for a third image and the projecting being based on the first candidate depth value, determining a first match error indication indicative of a difference between an image pixel value in the third image for the third depth map position and an image pixel value in the first image for the first depth map position, and determining the first weight in response to the first match error indication.

In accordance with an optional feature of the invention, the weighted combination includes candidate depth values determined from a region of the second depth map determined in response to the first depth map position.

This may provide an increased depth map consistency in many embodiments. The first candidate depth value may be derived from one or more depth values of the region.

In accordance with an optional feature of the invention, the region of the second depth map is determined as a region around the second depth map position, and the second depth map position is determined as depth map position in the second depth map equal to the first depth map position in the first depth map.

This may allow a low complexity and low resource yet efficient determination of suitable depth values to consider.

In accordance with an optional feature of the invention, the region of the second depth map is determined as a region around a position in the second depth map determined by a projection from the first depth map position based on an original depth value in the first depth map at the first depth map position.

This may provide an increased depth map consistency in many embodiments. The original depth value may be a depth value of the first depth map as received by the receiver.

In accordance with an optional feature of the invention, the method further comprises determining a second match error indication indicative of a difference between an image pixel value in the second image for the second depth map position and the image pixel value in the first image for the first depth map position; and wherein determining the first weight is also in response to the second match error indication.

This may provide improved depth maps in many embodiments.

In accordance with an optional feature of the invention, the method further comprises determining an additional match error indications indicative of differences between image pixel values in other images for depth map positions corresponding to the first depth map position and the image pixel value in the first image for the first depth map position; and wherein determining the first weight is also in response to the additional match error indications.

This may provide improved depth maps in many embodiments.

In accordance with an optional feature of the invention, the weighted combination includes depth values of the first depth map in a region around the first depth map position.

This may provide improved depth maps in many embodiments.

In accordance with an optional feature of the invention, the first weight is dependent on a confidence value of the first candidate depth value.

This may provide improved depth maps in many scenarios.

In accordance with an optional feature of the invention, only depth values of the first depth map for which a confidence value is below a threshold are updated.

This may provide improved depth maps in many scenarios and may in particular reduce the risk that accurate depth values are updated to less accurate depth values.

In accordance with an optional feature of the invention, the method further comprises selecting a set of depth values of the second depth map to include in the weighted combination subject to a requirement that a depth value of the set of depth values must have a confidence value above a threshold.

This may provide improved depth maps in many scenarios.

In accordance with an optional feature of the invention, the method further comprises: projecting a given depth map position for a given depth value in a given depth map to corresponding positions in a plurality of the corresponding depth maps; determining a variation measure for a set of depth values comprising the given depth value and depth values at the corresponding positions in the plurality of the corresponding depth maps; and determining a confidence value for the given depth map position in response to the variation measure.

This may provide a particularly advantageous determination of confidence values which may lead to improved depth maps.

In accordance with an optional feature of the invention, the method further comprises: projecting a given depth map position for a given depth value in a given depth map to a corresponding position in another depth map, the projection being based on the given depth value; projecting the corresponding position in the another depth map to a test position in the given depth map, the projection being based on a depth value at the corresponding position in the another depth map; determining a confidence value for the given depth map position in response to a distance between the given depth map position and the test position.

This may provide a particularly advantageous determination of confidence values which may lead to improved depth maps.

According to an aspect of the invention there is provided an apparatus for processing depth maps, the apparatus comprising: a receiver for receiving a plurality of images and corresponding depth maps representing a scene from different view poses; an updater for updating depth values of a first depth map of the corresponding depth maps based on depth values of at least a second depth map of the corresponding depth maps, the first depth map being for a first image and the second depth map being for a second image; the updating comprising: determining a first candidate depth value for a first depth pixel of the first depth map at a first depth map position in the first depth map, the first candidate depth value being determined in response to at least one second depth value of a second depth pixel of the second depth map at a second depth map position in the second depth map; determining a first depth value for the first depth pixel by a weighted combination of a plurality of candidate depth values for the first depth map position, the weighted combination including the first candidate depth value weighted by a first weight; wherein determining the first depth value comprises: determining a first image position in the first image for the first depth map position, determining a third image position in a third image of the plurality of images, the third image position corresponding to a projection of the first image position to the third image based on the first candidate depth value; determining a first match error indication indicative of a difference between an image pixel value in the third image for the third image position and an image pixel value in the first image for the first image position, and determining the first weight in response to the first match error indication.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

Figure 1:
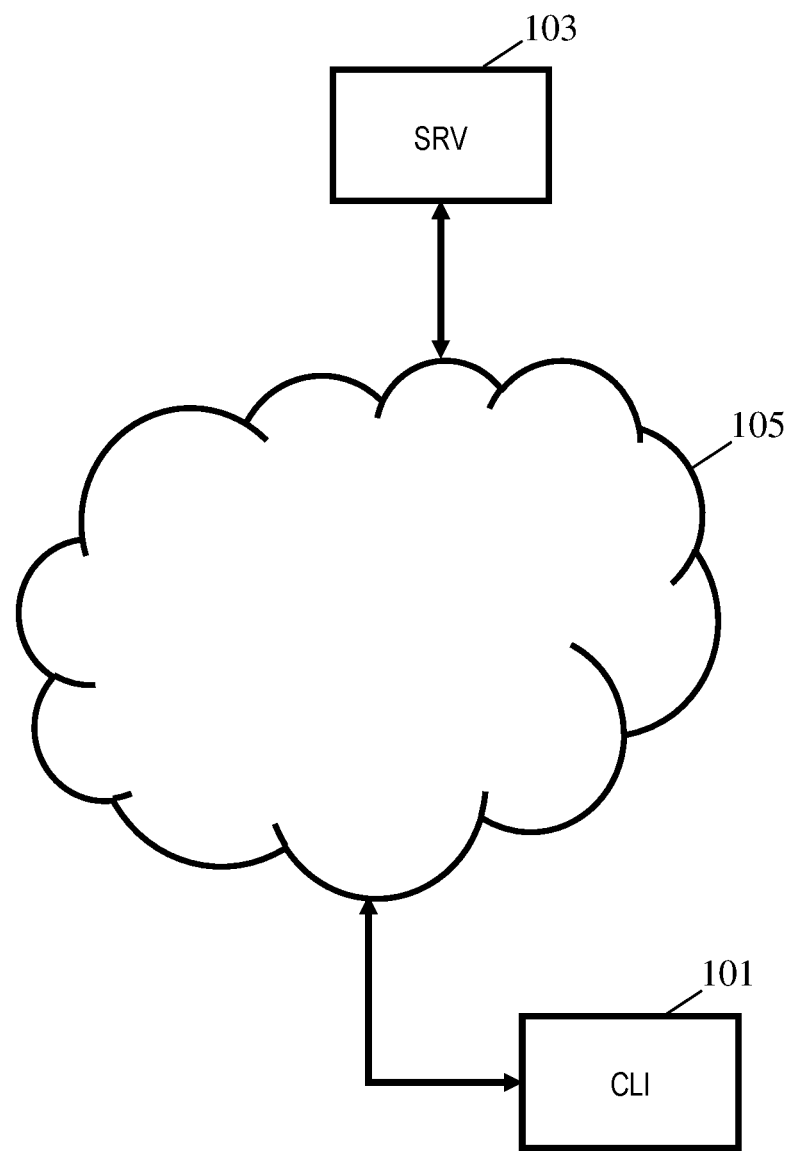
FIG. 1 illustrates an example of an arrangement for providing a virtual reality experience.

The following description focuses on embodiments of the invention applicable to a virtual reality experience but it will be appreciated that the invention is not limited to this application but may be applied to many other systems and applications, such as in particular applications including view synthesis.

Virtual experiences allowing a user to move around in a virtual world are becoming increasingly popular and services are being developed to satisfy such a demand. However, provision of efficient virtual reality services is very challenging, in particular if the experience is to be based on a capture of a real-world environment rather than on a fully virtually generated artificial world.

In many virtual reality applications, a viewer pose input is determined reflecting the pose of a virtual viewer in the scene. The virtual reality apparatus/system/application then generates one or more images corresponding to the views and viewports of the scene for a viewer corresponding to the viewer pose.

Typically, the virtual reality application generates a three-dimensional output in the form of separate view images for the left and the right eyes. These may then be presented to the user by suitable means, such as typically individual left and right eye displays of a VR headset. In other embodiments, the image may e.g. be presented on an autostereoscopic display (in which case a larger number of view images may be generated for the viewer pose), or indeed in some embodiments only a single two-dimensional image may be generated (e.g. using a conventional two-dimensional display).

The viewer pose input may be determined in different ways in different applications. In many embodiments, the physical movement of a user may be tracked directly. For example, a camera surveying a user area may detect and track the user's head (or even eyes). In many embodiments, the user may wear a VR headset which can be tracked by external and/or internal means. For example, the headset may comprise accelerometers and gyroscopes providing information on the movement and rotation of the headset and thus the head. In some examples, the VR headset may transmit signals or comprise (e.g. visual) identifiers that enable an external sensor to determine the movement of the VR headset.

In some systems, the viewer pose may be provided by manual means, e.g. by the user manually controlling a joystick or similar manual input. For example, the user may manually move the virtual viewer around in the scene by controlling a first analog joystick with one hand and manually controlling the direction in which the virtual viewer is looking by manually moving a second analog joystick with the other hand.

In some applications a combination of manual and automated approaches may be used to generate the input viewer pose. For example, a headset may track the orientation of the head and the movement/position of the viewer in the scene may be controlled by the user using a joystick.

The generation of images is based on a suitable representation of the virtual world/environment/scene. In some applications, a full three-dimensional model may be provided for the scene and the views of the scene from a specific viewer pose can be determined by evaluating this model.

In many practical systems, the scene may be represented by an image representation comprising image data. The image data may typically comprise one or more images associated with one or more capture or anchor poses, and specifically images may be included for one or more view ports with each view port corresponding to a specific pose. An image representation may be used comprising one or more images where each image represents the view of a given view port for a given view pose. Such view poses or positions for which image data is provided are often also referred to as anchor poses or positions, or capture poses or positions (since the image data may typically correspond to images that are or would be captured by cameras positioned in the scene with the position and orientation corresponding to the capture pose).

The images are typically associated with depth information and specifically a depth image or map is typically provided. Such a depth map may provide a depth value for each pixel in the corresponding image where the depth value is indicative of a distance from the camera/anchor/capture position to the object/scene point which is depicted by the pixel. Thus, the pixel value may be considered to represent a ray from an object/point in the scene to the capture device of the camera, and the depth value for a pixel may reflect the length of this ray.

In many embodiments, the resolution of an image and the corresponding depth map may be the same and thus an individual depth value may be included for each pixel in the image, i.e. the depth map may include one depth value for each pixel of the image. In other embodiments, the resolution may be different and e.g. the depth map may have lower resolution such that one depth value may apply to a plurality of image pixels. The following description will focus on an embodiment where the resolution of an image and the corresponding depth map is the same and thus for each image pixel (pixel of the image), there is a separate depth map pixel (pixel of the depth map).

A depth value may be any value which is indicative of the depth for a pixel, and thus it may be any value indicative of the distance from the camera position to the object of the scene depicted by a given pixel. A depth value may for example be a disparity value, a z-coordinate, a distance measure etc.

Many typical VR applications may on the basis of such an image plus depth representation proceed to provide view images corresponding to viewports for the scene for the current viewer pose with the images being dynamically updated to reflect changes in the viewer pose and with the images being generated based on the image data representing the (possibly) virtual scene/environment/world. The application may do this by performing view synthesis and view shift algorithms as will be known to the skilled person.

In the field, the terms placement and pose are used as a common term for position and/or direction/orientation. The combination of the position and direction/orientation of e.g. an object, a camera, a head, or a view may be referred to as a pose or placement. Thus, a placement or pose indication may comprise six values/components/degrees of freedom with each value/component typically describing an individual property of the position/location or the orientation/direction of the corresponding object. Of course, in many situations, a placement or pose may be considered or represented with fewer components, for example if one or more components is considered fixed or irrelevant (e.g. if all objects are considered to be at the same height and have a horizontal orientation, four components may provide a full representation of the pose of an object). In the following, the term pose is used to refer to a position and/or orientation which may be represented by one to six values (corresponding to the maximum possible degrees of freedom).

Many VR applications are based on a pose having the maximum degrees of freedom, i.e. three degrees of freedom of each of the position and the orientation resulting in a total of six degrees of freedom. A pose may thus be represented by a set or vector of six values representing the six degrees of freedom and thus a pose vector may provide a three-dimensional position and/or a three-dimensional direction indication. However, it will be appreciated that in other embodiments, the pose may be represented by fewer values.

A pose may be at least one of an orientation and a position. A pose value may be indicative of at least one of an orientation value and a position value.

A system or entity based on providing the maximum degree of freedom for the viewer is typically referred to as having 6 Degrees of Freedom (6DoF). Many systems and entities provide only an orientation or position, and these are typically known as having 3 Degrees of Freedom (3DoF).

In some systems, the VR application may be provided locally to a viewer by e.g. a stand-alone device that does not use, or even have any access to, any remote VR data or processing. For example, a device such as a games console may comprise a store for storing the scene data, input for receiving/generating the viewer pose, and a processor for generating the corresponding images from the scene data.

In other systems, the VR application may be implemented and performed remote from the viewer. For example, a device local to the user may detect/receive movement/pose data which is transmitted to a remote device that processes the data to generate the viewer pose. The remote device may then generate suitable view images for the viewer pose based on scene data describing the scene. The view images are then transmitted to the device local to the viewer where they are presented. For example, the remote device may directly generate a video stream (typically a stereo/3D video stream) which is directly presented by the local device. Thus, in such an example, the local device may not perform any VR processing except for transmitting movement data and presenting received video data.

In many systems, the functionality may be distributed across a local device and remote device. For example, the local device may process received input and sensor data to generate viewer poses that are continuously transmitted to the remote VR device. The remote VR device may then generate the corresponding view images and transmit these to the local device for presentation. In other systems, the remote VR device may not directly generate the view images but may select relevant scene data and transmit this to the local device which may then generate the view images that are presented. For example, the remote VR device may identify the closest capture point and extract the corresponding scene data (e.g. spherical image and depth data from the capture point) and transmit this to the local device. The local device may then process the received scene data to generate the images for the specific, current view pose. The view pose will typically correspond to the head pose, and references to the view pose may typically equivalently be considered to correspond to the references to the head pose.

In many applications, especially for broadcast services, a source may transmit scene data in the form of an image (including video) representation of the scene which is independent of the viewer pose. For example, an image representation for a single view sphere for a single capture position may be transmitted to a plurality of clients. The individual clients may then locally synthesize view images corresponding to the current viewer pose.

An application which is attracting particular interest is where a limited amount of movement is supported such that the presented views are updated to follow small movements and rotations corresponding to a substantially static viewer making only small head movements and rotations of the head. For example, a viewer sitting down can turn his head and move it slightly with the presented views/images being adapted to follow these pose changes. Such an approach may provide a highly and immersive e.g. video experience. For example, a viewer watching a sports event may feel that he is present at a particular spot in the arena.

Such limited freedom applications have the advantage of providing an improved experience while not requiring an accurate representation of a scene from many different positions thereby substantially reducing the capture requirements. Similarly, the amount of data that needs to be provided to a renderer can be reduced substantially. Indeed, in many scenarios, only image and typically depth data for a single viewpoint need to be provided with the local renderer being able to generate the desired views from this.

The approach may specifically be highly suitable for applications where the data needs to be communicated from a source to a destination over a bandlimited communication channel, such as for example for a broadcast or client server application.

FIG. 1 illustrates such an example of a VR system in which a remote VR client device 101 liaises with a VR server 103 e.g. via a network 105, such as the Internet. The server 103 may be arranged to simultaneously support a potentially large number of client devices 101.

The VR server 103 may for example support a broadcast experience by transmitting an image signal comprising an image representation in the form of image data that can be used by the client devices to locally synthesize view images corresponding to the appropriate poses.

Figure 2:
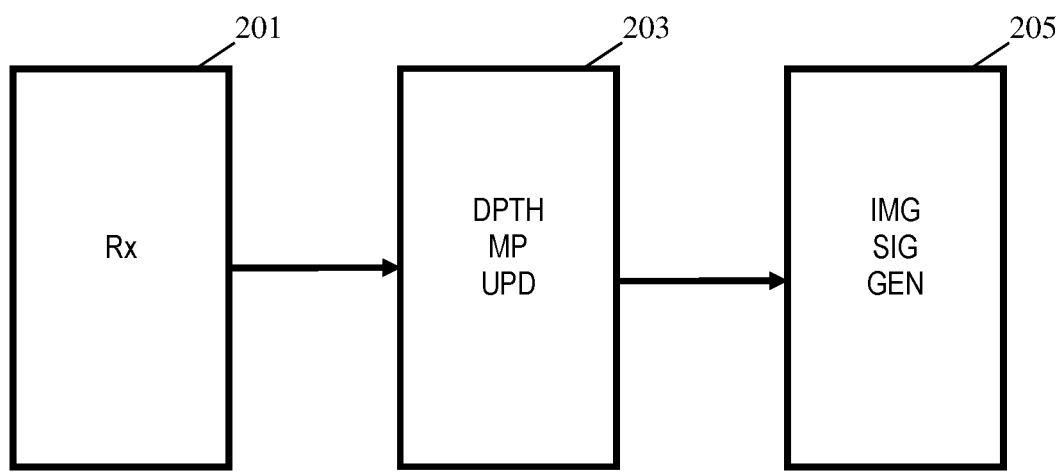
FIG. 2 illustrates an example of elements of an apparatus for processing depth maps in accordance with some embodiments of the invention.
Figure 3:
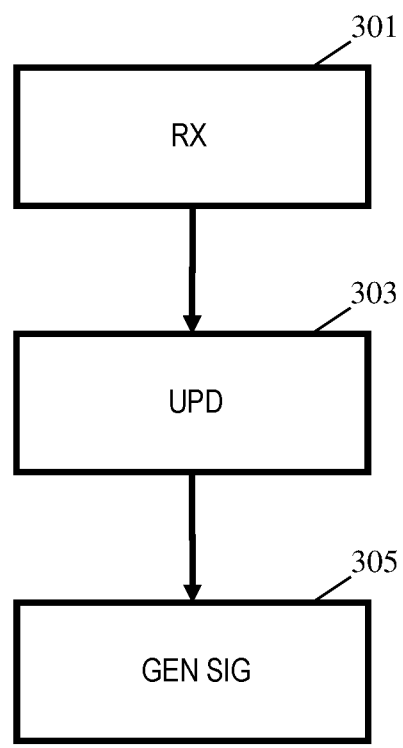
FIG. 3 illustrates an example of elements of a method of processing depth maps in accordance with some embodiments of the invention.

FIG. 2 illustrates an example elements of an exemplary implementation of an apparatus for processing depth maps. The apparatus may specifically be implemented in the VR server 103 and will be described with reference to this. FIG. 3 illustrates a flowchart for a method of processing a depth map performed by the apparatus of FIG. 2

The apparatus/VR server 103 comprises a receiver 201 which performs step 301 in which a plurality of images and corresponding depth maps representing a scene from different view poses is received.

The images comprise light intensity information and pixel values of the images reflect a light intensity value. In some examples, a pixel value may be a single value, such as a brightness for a greyscale image, but in manly embodiments a pixel value may be a set or vector of (sub)values such as e.g. color channel values for a color image (e.g. RGB or Yuv values may be provided).

A depth map for an image may comprise depth values for the same viewport. For example, for each pixel of an image for a given view/capture/anchor pose, the corresponding depth map comprise a pixel with depth value. Thus, the same position in the image and its corresponding depth map provide respectively the light intensity and depth for the ray corresponding to the pixel. In some embodiments, a depth map may have a lower resolution and e.g. one depth map pixel may correspond to a plurality of image pixels. However, in such a case there may still be a direct one-to-one correspondence between a position in the depth map and a position in the depth map (including for sub-pixel positions)

Figure 4:
FIG. 4 illustrates an example of a camera setup for capturing a scene.

For brevity and complexity, the following description will focus on an example where only three images and corresponding depth maps are provided. It is further assumed that these images are provided by a linear arrangement of cameras capturing a scene from three different view positions and with the same orientation as indicated in FIG. 4.

It will be appreciated that in many embodiments, a substantially larger number of images are often received, and the scene is often captured from a substantially larger number of capture poses.

The receiver is fed to a depth map updater which in the following for brevity is simply referred to as an updater 203. The updater 203 performs step 303 in which one or more (and typically all) of the received depth maps are updated. The updating comprises updating depth values of a first received depth map based on depth values of at least a second received depth map. Thus, a cross-depth map and cross view pose updating is performed to generate an improved depth map.

The updater 203 is in the example coupled to an image signal generator 205 which performs step 305 in which it generates an image signal comprising the received images together with the updated depth maps. The image signal may then e.g. be transmitted to the VR client device 101 where it may be used as the basis for synthesizing view images for a current viewer pose.

In the example, the depth map updating is thus performed in the VR server 103 with the updated depth maps being distributed to VR client devices 101. However, in other embodiments, the depth map updating may e.g. be performed in the VR client device 101. For example, the receiver 201 may be part of the VR client device 101 and receive the images and corresponding depth maps from the VR server 103. The received depth maps may then be updated by the updater 203 and instead of an image signal generator 205 the apparatus may comprise a renderer or view image synthesizer arranged to generate new views based on the images and updated depth maps.

In yet other embodiments, all processing may be performed in a single device. For example, the same device may receive direct captured information and generate the initial depth maps, e.g. by disparity estimation. The resulting depth maps may be updated and a synthesizer of the device may dynamically generate new views.

Thus, the location of the described functions and the specific use of the updated depth maps will depend on the preferences and requirements of the individual embodiment.

The updating of the depth map(s) accordingly is based on one or more of the other depth maps which represent depth from a different spatial position and for a different image. The approach exploits the realization that for depth maps it is not only the absolute accuracy or reliability of the individual depth value or depth map that is important for the resulting perceived quality but that the consistency between different depth maps is also highly important.

Indeed, a heuristically obtained insight is that when errors or inaccuracies are inconsistent between depth maps, i.e. they vary over source views, they are perceived as especially harmful as they effectively cause the virtual scene to be perceived to judder when the viewer changes position.

Such view-consistency is not always sufficiently enforced during the depth map estimation process. For instance, this is the case when using separate depth sensors to obtain a depth map for each view. In that case, the depth data is captured fully independently. In the other extreme, where all views are used to estimate depth (e.g. using a plane sweep algorithm), the result may still be inconsistent since results will depend on the specific multi-view disparity algorithm used and it's parameter settings. The specific approach described in the following may in many scenarios mitigate such issues and may update the depth maps to result in an improved consistency between depth maps, and thus improved perceived image quality. The approach may improve the quality of depth maps for a set of multi-view images of a scene.

Figure 5:
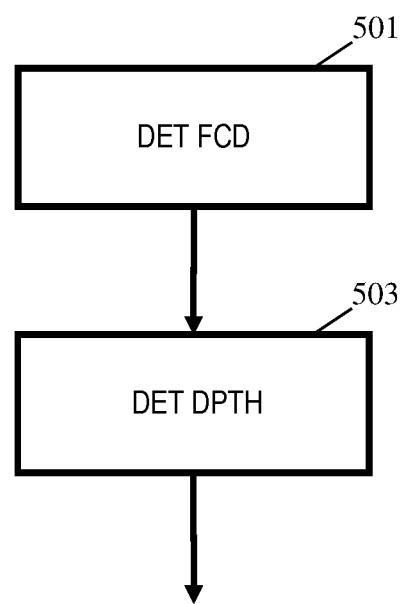
FIG. 5 illustrates an example of elements of a method of updating depth maps in accordance with some embodiments of the invention.

FIG. 5 illustrates a flow chart for the updating performed for one pixel of one depth map. The approach may be repeated for some or all of the depth map pixels to generate an updated first depth map. The process may then further be repeated for other depth maps.

The update of the pixel, henceforth referred to as the first depth pixel, in the depth map, henceforth referred to as the first depth map, initiates in step 501 in which a first candidate depth value is determined for the first depth pixel. The position of the first depth pixel in the first depth map is referred to as the first depth map position. Corresponding terminology is used for the other views with only the numerical label changing.

The first candidate depth value is determined in response to at least one second depth value which is a depth value of a second depth pixel which is at a second depth map position in a second depth map. Thus, the first candidate depth value is determined from one or more depth values of another one of the depth maps. The first candidate depth value may specifically be an estimate of the correct depth value for the first depth pixel based on information contained in the second depth map.

Step 501 is followed by step 503 in which an updated first depth value is determined for the first depth pixel by a weighted combination of a plurality of candidate depth values for the first depth map position. The first candidate depth value determined in step 503 is included in the weighted combination.

Thus, in step 501 one out of a plurality of candidate depth values for the subsequent combination is determined. In most embodiments, a plurality of candidate depth values may be determined in step 501 by repeating the process described for the first candidate depth value for other depth values in the second depth map and/or for depth values in other depth maps.

In many embodiments, one or more of the candidate depth values may be determined in other ways or from other sources. In many embodiments, one or more of the candidate depth values may be depth values from the first depth map, such as depth values in a neighborhood of the first depth pixel. In many embodiments, the original first depth value, i.e. the depth value for the first depth pixel in the first depth map as received by the receiver 201, may be included as one of the candidate depth values.

Thus, the updater 205 may perform a weighted combination of candidate depth values which include at least one candidate depth value determined as described above. The number, properties, origin etc. of any other candidate depth values will depend on the preferences and requirements of the individual embodiment and the exact depth update operation that is desired.

For example, the weighted combination may in some embodiments only include the first candidate depth value determined in step 501 and the original depth value. In such a case, only a single weight for the first candidate depth value may e.g. be determined and the weight for the original depth value may be constant.

As another example, in some embodiments, the weighted combination may be a combination of a large number of candidate depth values including values determined from other depth maps and/or positions, the original depth value, depth values in a neighborhood in the first depth map, or indeed even based on depth values in alternative depth maps such as e.g. a depth map using a different depth estimation algorithm. In such more complex embodiments, a weight may e.g. be determined for each candidate depth value.

It will be appreciated that any suitable form of weighted combination may be used, including e.g. non-linear combinations or selection combining (where one candidate depth value is given a weight of one and all other candidate depth values are given a weighting of zero). However, in many embodiments, a linear combination, and specifically a weighted averaging may be used.

Thus, as a specific example, the updated depth value $\tilde{z}_k(u, v)$ for the image coordinate $(u, v)$ in depth map/view k may be a weighted mean of a set of $i \in \{1, \ldots, n\}$ candidate depth values $z_i$ of which at least one is generated as described for step 501. The weighted combination may in this case correspond to a filter function given as:

$$\tilde{z}_k(u, v) = \frac{\sum_{i=1}^{n} z_i \cdot w_i}{\sum_{i=1}^{n} w_i},$$

where $\tilde{z}_k(u, v)$ is the updated depth value at pixel position $(u, v)$ for view k, $z_i$ is the i-th input candidate depth value, and $w_i$ is the weight of the i-th input candidate depth value.

Figure 6:
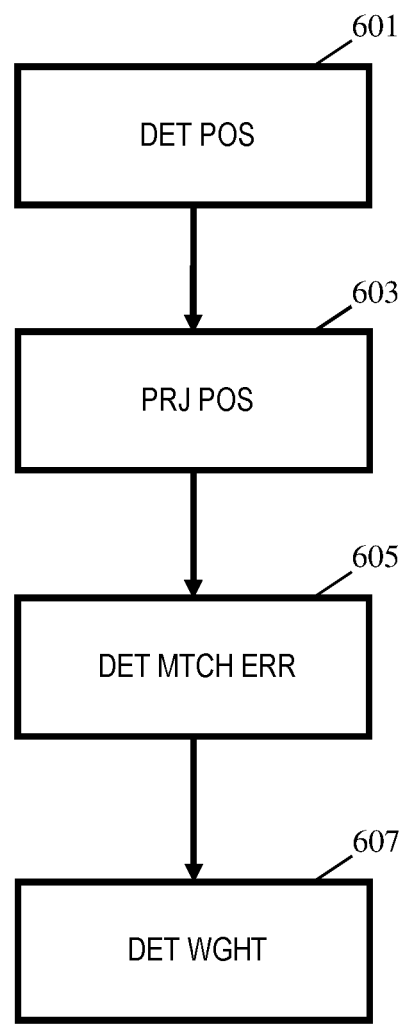
FIG. 6 illustrates an example of elements of a method of determining weights in accordance with some embodiments of the invention.

The method uses a specific approach for determining the weight of the first candidate depth value, i.e. the first weight. The approach will be described with reference to the flowchart of FIG. 6 and the image and depth map example of FIG. 7.

Figure 7:
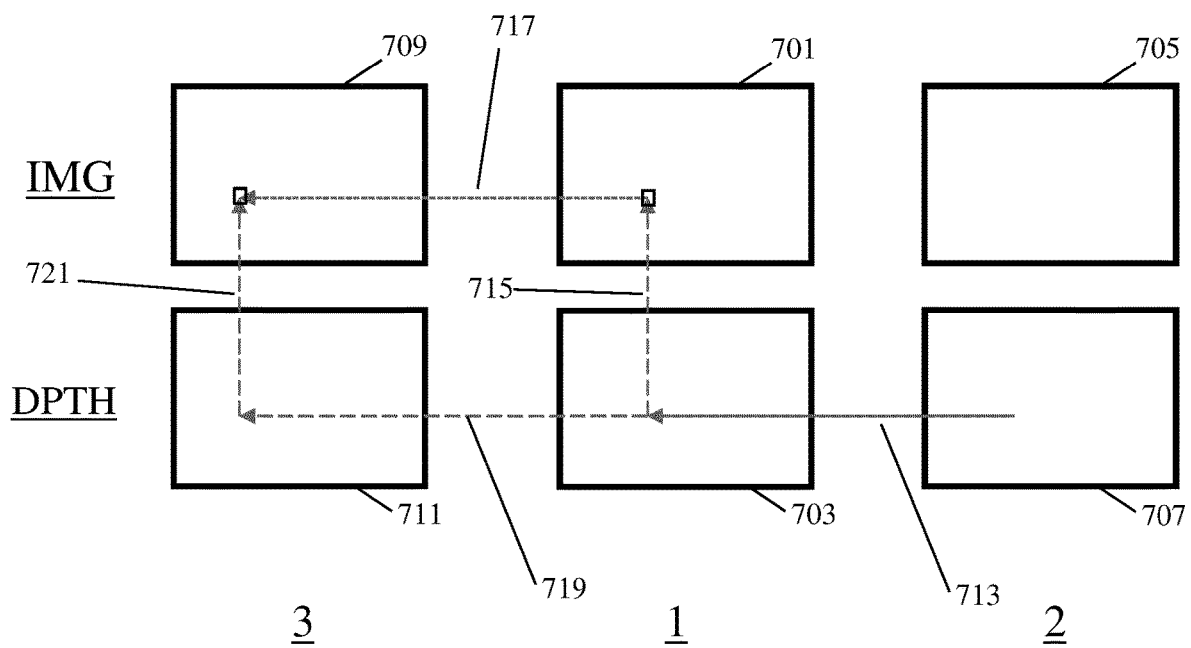
FIG. 7 illustrates an example of processing of depth maps and images in accordance with some embodiments of the invention.

FIG. 7 illustrates an example where three images and three corresponding depth maps are provided/considered. A first image 701 is provided together with a first depth map 703. Similarly, a second image 705 is provided together with a second depth map 707, and a third image 709 is provided together with a third depth map 711. The following description will focus on the determination of a first weight for the first depth value of the first depth map 703 based on depth values from the second depth map 707 and further considering the third image 709.

The determining of the first weight (for the first candidate depth value) is thus determined for a first depth pixel/first depth map position based on one or more second depth values for second depth pixels at second depth map positions in the second depth map 707. Specifically, the first candidate depth value may be determined as a second depth value being at a corresponding position in the second depth map 707 as indicated by arrow 713 in FIG. 7.

The determination of the first weight initiates in step 601 where the updater determines a first image position in the first image 701 corresponding to the first depth map position as indicated by arrow 715. Typically, this may simply be the same position and image coordinates. The pixel in the first image 701 corresponding to this first image position is referred to as the first image pixel.

The updater 203 then proceeds in step 603 to determine a third image position in a third image 709 of the plurality of images where the third image position corresponds to a projection of the first image position to the third image based on the first candidate depth value. The third image position may be determined by a direct projection from the image coordinates of the first image 701 is indicated by arrow 717.

The updater 203 accordingly proceeds to project the first image position to a third image position in the third image 709. The projection is based on the first candidate depth value. Thus, the projection of the first image position to the third image 709 is based on a depth value which can be considered to be an estimate of the first depth value determined on the basis of the second depth map 707.

In some embodiments, the determination of the third image position may be based on projections of depth map positions. For example, the updater 203 may proceed to project the first depth map position (the position of the first depth pixel) to a third depth map position in the third depth map 711 as indicated by arrow 719. The projection is based on the first candidate depth value. Thus, the projection of the first depth map position to the third depth map 711 is based on a depth value which can be considered to be an estimate of the first depth value determined on the basis of the second depth map 707.

The third image position may then be determined as the image position in the third image 709 which corresponds to the third depth map position as indicated by arrow 721.

It will be appreciated that the two approaches are equivalent.

A projection from one depth map/image to a different depth map/image may be a determination of a depth map/image position in the different depth map/image which represents the same scene point as the depth map/image position in the one depth map/image. As the depth maps/images represent different view/capture poses, the parallax effect will result in a shift in the image position for a given point in the scene. The shift will be dependent on the change in view pose and on the depth of the point in the scene. A projection from one image/depth map to another image/depth map may accordingly also be referred to as an image/depth map position shift or determination.

As an example, a projection of an image coordinate $(u, v)_l$ in one view (l) together with its depth value $z_l(u, v)$ into the corresponding image coordinate $(u, v)_k$ of neighboring view (k) may e.g. for perspective cameras be performed by the following steps:

1. The image coordinate $(u, v)_l$ is un-projected using $z_l$ in 3d-space $(x, y, z)_l$ using the camera-intrinsic parameters (focal length and principle point) for a camera (l).
2. The un-projected point in the coordinate system of camera (l), $(x, y, z)_l$ is transformed to the coordinate system of camera (k) $(x, y, z)_k$ using their relative extrinsic parameters (camera rotation matrix R and translation vector t).
3. Finally point $(x, y, z)_k$ is projected (using the camera intrinsics of k) onto the image plane of camera (k) yielding the image-coordinate $(u, v)_k$.

For other camera projection types e.g. equirectangular projection (ERP) a similar mechanism may be used.

In the described approach, the projection being based on the first candidate depth value may be considered to correspond to determination of the third depth map/image position for a scene point of the first depth map/image position having a depth of the first candidate depth value (and for the change in view pose between the first and third view poses).

Different depths will result in different shifts, and in the present case, the shift in image and depth map position between the first view pose for the first depth map 703 and first image 701, and the third view pose for the third depth map 711 and the third image 709, is based on at least one depth value in the second depth map 707.

In step 603 the updater 203 accordingly determines the position in the third depth map 711 and third image 709 which would reflect the same scene point as the first image pixel in the first image 701 if indeed the first candidate depth value is a correct value for the first depth value and first image pixel. Any deviation of the first candidate depth value from the correct value may result in an incorrect position being determined in the third image 709. It should be noted that the scene point here refers to a scene point which is on the rays associated with the pixels but that they may not necessarily be the most forward scene points for both view poses. For example, if the scene point seen from the first view pose is occluded by a (more) foreground object than when seen from the second view pose, the depth values of the depth maps, and of the images, may represent different scene points and therefore have potentially very different values.

Step 603 is followed by step 605 where a first match error indication is generated based on the content of the first and third images 701, 709 at respectively the first image position and the third image position. Specifically, the image pixel value in the third image at the third image position is retrieved. In some embodiments, this image pixel value may be determined as the image pixel value in the third image 709 for which the third depth map position in the third depth map 711 provides a depth value is determined. It will be appreciated that in many embodiments, i.e. where the same resolution is used for the third depth map 711 and the third image 709, the direct determination of a position in the third image 709 corresponding to the first depth map position (arrow 719) is equivalent to determining a position in the third depth map 711 and retrieving the corresponding image pixel.

Similarly, the updater 203 proceeds to extract the pixel value in the first image 701 at the first image position. It then proceeds to determine a first match error indication which is indicative of the difference between these two image pixel values. It will be appreciated that any suitable difference measure can be used, such as e.g. a simple absolute difference, a sum square root difference applied to the pixel value components of e.g. multiple color channels, etc.

Thus, the updater 203 determines 605 a first match error indication indicative of a difference between an image pixel value in the third image for the third image position and an image pixel value in the first image for the first image position.

The updater 203 then proceeds in step 607 in which the first weight is determined in response to the first match error indication. It will be appreciated that the specific approach for determining the first weight from the first match error indication may depend on the individual embodiment. In many embodiments, complex considerations including e.g. other match error indications may be used and further examples will be provided later.

As a low complexity example, the first weight may in some embodiments be determined as a monotonically decreasing function of the first match error indication, and in many embodiments without any other parameters being considered.

For example, in an example where the weighted combination includes only the first candidate depth value and the original depth value of the first depth pixel, the combination may apply a fixed weight to the original depth value and a first weight which increases the lower the first match error indication is (with typically a weight normalization further being included).

The first match error indication may be considered to reflect how well the first and third images match in representing a given scene point. If there is no occlusion difference between the first and third images, and if the first candidate depth value is a correct value, the image pixel values should be the same and the first match error indication should be zero. If the first candidate depth value deviates from the correct value, the image pixels in the third image may not directly correspond to the same scene point, and thus the first match error indication may increase. If there is a change in occlusion, the error is likely to be very high. The first match error indication may thus provide a good indication of how accurate and suitable the first candidate depth value is for the first depth pixel.

In different embodiments, different approaches may be used to determine the first candidate depth value from one or more of the depth values of the second depth map. Similarly, different approaches may be used to determine which candidate values are generated for the weighted combination. Specifically, a plurality of candidate values may be generated from the depth values of the second depth map, and weights may be individually calculated for each of these in accordance with the approach described with respect to FIG. 6.

In many embodiments, the determination of which second depth values to use to derive the first candidate depth value is dependent on a projection between the first depth map and the second depth map such that corresponding positions in the two depth maps are determined. Specifically, in many embodiments, the first candidate depth value may be determined as a second depth value at a second depth map position which is considered to correspond to the first depth map position, i.e. the second depth value is selected as the depth value which is considered to represent the same scene point.

The determination of the corresponding first depth map position and second depth map position may be based on a projection from the first depth map to the second depth map, i.e. it may be based on the original first depth value, or it may be based on a projection from the second depth map to the first depth map, i.e. it may be based on the second depth value. In some embodiments, projections in both directions may be performed and e.g. an average of these may be used.

Thus, determining the first candidate depth value may comprise determining the second depth map position relative to the first depth map position by a projection between the first view pose of the first image and the second view pose of the second image based on at least one of the second value and a first original depth value of the first depth map.

For example, for a given first pixel in the first depth map the updater 203 may extract the depth value and use this to project the corresponding first depth map position to a corresponding second depth map position in the second depth map. It may then extract the second depth value at this position and use it as the first candidate depth value.

As another example, for a given second pixel in the second depth map the updater 203 may extract the depth value and use this to project the corresponding second depth map position to a corresponding first depth map position in the first depth map. It may then extract the second depth value and use this as the first candidate depth value for the first depth pixel at the first depth map position.

In such embodiments, the depth value in the second depth map is used directly as a first candidate depth value. However, as the two depth map pixels represent the distance to (in the absence of occlusions) the same scene point but from different viewpoints, the depth values may be different. In many practical embodiments, this difference in distance from cameras/view poses at different positions to the same scene point is insignificant and can be ignored. Therefore, in many embodiments, it may be assumed that cameras are perfectly aligned and looking in the same direction and have the same position. In that case, if the object is flat and parallel to the image sensor, the depth may indeed be exactly the same in the two corresponding depth maps. Deviations from this scenario is often sufficiently small to be negligible.

However, in some embodiments, the determination of the first candidate depth value from the second depth value may include a projection which modifies the depth value. This may be based on a more detailed geometric calculation including considering the projective geometry of both views.

In some embodiments, more than a single second depth value may be used to generate the first candidate depth value. For example, a spatial interpolation may be performed between different depth values to compensate for the projections not being aligned with the centers of pixels.

As another example, in some embodiments, the first candidate depth value may be determined as the result of a spatial filtering with a kernel centered on the second depth map position being applied to the second depth map.

The following description will focus on embodiments where each candidate depth value is dependent on only a single second depth value, and further is equal to a second depth value.

In many embodiments, the weighted combination may further include a plurality of candidate depth values determined from different second depth values.

Specifically, in many embodiments, the weighted combination may include candidate depth values from a region of the second depth map. The region may typically be determined based on the first depth map position. Specifically, the second depth map position may be determined by a projection (in either or both directions) as previously described and the region may be determined as a region (e.g. with a predetermined outline) around this second depth map position.

This approach may accordingly provide a set of candidate depth values for the first depth pixel in the first depth map. For each of the candidate depth values, the updater 203 may perform the method of FIG. 6 to determine a weight for the weighted combination.

A particular advantage of the approach is that the selection of second depth values for candidate depth values is not overly critical as the subsequent weight determination will weigh good and bad candidates appropriately. Accordingly, in many embodiments, a relatively low complexity approach may be used to select the candidates In many embodiments, the region may e.g. be determined simply as a predetermined region around a position in the second depth map determined by a projection from the first depth map to the second depth map based on the original first depth value. Indeed, in many embodiments, the projection may even be replaced by simply selecting the region as a region around the same depth map position in the second depth map as in the first depth map. Thus, the approach may simply select a candidate set of depth values by selecting second depth values in a region around the same position in the second depth map as the position of the first pixel in the first depth map.

Such an approach may reduce resource usage yet provide efficient operation in practice. The approach may in particular be suitable when the size of the region is relatively large compared to the position/parallax shifts that occur between the depth maps.

As previously mentioned, many different approaches may be used to determine the weights for the individual candidate depth values in the weighted combination.

In many embodiments, the first weight may further be determined in response to additional match error indications determined for other images than the third image. In many embodiments, the described approach may be used to generate a match error indication for all other images than the first image. A combined match error indication may then be generated, e.g. as the average of these, and the first weight may be determined based on this.

Specifically, the first weight may depend on a match error metric that is a function of the separate match errors from the view that is being filtered to all other views l≠k. One example metric for determining the weight for candidate $z_i$ is:

$$w_i(z_i) = \min_{l \neq k}(e_{kl}(z_i)),$$

where $e_{kl}(z_i)$ is the match error between views k and l given candidate $z_i$. The match error may e.g. depend on the color difference for a single pixel or may be calculated as a spatial average around pixel location (u, v). Instead of calculating the minimum match error over views l≠k, the mean or median may e.g. be used. The evaluation function may in many embodiments preferably be robust to match error outliers caused by occlusion.

In many embodiments, a second match error indication may be determined for the second image, i.e. for the view from which the first candidate depth value was generated. The determination of this second match error indication may use the same approach as described for the first match error indication and the second match error indication may be generated to indicate a difference between an image pixel value in the second image for the second depth map position and the image pixel value in the first image for the first depth map position.

The first weight may then be determined in response to both the first match error indication and the second match error indication (as well as possibly other match error indications or parameters).

In some embodiments, this weight determination may not only consider e.g. the average match error indication but may also consider the relative differences between the match indications. For example, if the first match error indication is relatively low but the second match error indication is relatively high, this may possibly be due to an occlusion occurring in the second image with respect to the first image (but not in the third image). Accordingly, the first weight may be reduced or even set to zero.

Other examples of weight considerations may e.g. use statistical measures such as median match error or another quantile. A similar reasoning as above applies here. If we for instance have a linear camera array of nine cameras all looking in the same direction we may assume for the center camera that around an object edge four anchors to the left or four anchors to the right will always look into a dis-occluded region. In this case a good total weight for a candidate may be a function only of the four lowest of the total of eight match errors.

In many embodiments, the weighted combination may include other depth values of the first depth map itself. Specifically, a set of depth pixels in the first depth map around the first depth position may be included in the weighted combination. For example, a predetermined spatial kernel may be applied to the first depth map resulting in a low pass filtering of the first depth map. The weighting of the spatially low pass filtered first depth map values and the candidate depth values from other views may then be adapted, e.g. by applying a fixed weight to the low pass filtered depth value and a variable first weight for the first candidate depth value.

In many embodiments, the determination of the weights, and specifically the first weight, is also dependent on confidence values for the depth values.

Depth estimation and measurement is inherently noisy and various errors and variations can occur. Many depth estimation and measurement algorithms may in addition to the depth estimate also generate a confidence value indicating how reliable the provided depth estimate is. For example, a disparity estimation may be based on detecting matching regions in different images, and the confidence value may be generated to reflect how similar the matching regions are.

The confidence values may be used in different ways. For example, in many embodiments, the first weight for the first candidate depth value may be dependent on the confidence value for the first candidate depth value, and specifically for the second depth value used to generate the first candidate depth value. The first weight may be a monotonically increasing function of the confidence value for the second depth value, and thus the first weight may increase for an increasing confidence of the underlying depth value(s) used to generate the first candidate depth value. Accordingly, the weighted combination may be biased towards depth values that are considered to be reliable and accurate.

In some embodiments, the confidence values for the depth map may be used to select which depth values/pixels are updated and for which depth pixels the depth value is kept unchanged. Specifically, the updater 203 may be arranged to select only depth values/pixels of the first depth map for which a confidence value is below a threshold to be updated.

Thus, rather than updating all pixels in the first depth map, the updater 203 specifically identifies depth values that are considered to be unreliable and updates only these values. This may in many embodiments result in an improved overall depth map as it can be prevented that e.g. very accurate and reliable depth estimates are replaced by more uncertain values generated from depth values from other viewpoints.

In some embodiments, the set of depth values of the second depth map that are included in the weighted combination, either by contributing to different candidate depth values or to the same candidate depth value, may be dependent on the confidence values for the depth values. Specifically, only depth values having a confidence value above a given threshold may be included and all other depth values may be discarded from the processing.

For example, the updater 203 may initially generate a modified second depth map by scanning the second depth map and removing all depth values for which the confidence value is below a threshold. The previously described processing may then be performed using the modified second depth map with all operations requiring a second depth value being bypassed if no such second depth value is present in the second depth map. For example, no candidate depth value is generated for a second depth value if no such value is present.

In some embodiments, the updater 203 may also be arranged to generate confidence values for the depth values.

In some embodiments, the confidence value for a given depth value in a given depth map may be determined in response to the variation of depth values in other depth maps for the corresponding positions in these depth maps.

The updater 203 may first project the depth map position for the given depth value for which the confidence value is determined to corresponding positions in a plurality of the other depth maps, and typically to all of these.

Specifically, for the given depth value at image coordinate $(u, v)_k$ in depth map k, a set of other depth maps (typically for neighboring views) L is determined. For each of these depth maps ($l \in L$), the corresponding image coordinate $(u, v)_l$ for $l \in L$ is calculated by re-projection.

The updater 203 may then consider the depth values in these other depth maps at these corresponding positions. It may proceed to determine a variation measure for these depth values at the corresponding positions. Any suitable measure of variation may be used, such as e.g. a variance measure.

The updater 203 may then proceed to determine the confidence value for the given depth map position from this variation measure, and specifically an increasing degree of variation may indicate a decreasing confidence value. Thus, the confidence value may be a monotonically decreasing function of the variation measure.

Specifically, given the depth value $z_k$ and the set of corresponding neighboring depth values $z_l$ at $(u, v)_l$ for $l \in L$, a confidence metric may be calculated based on the consistency of these depth values. For example, the variance of these depth values may be used as confidence metric. Low variance then implies high confidence.

It is often desirable to make this determination more robust to outliers that may result from corresponding image coordinates $(u, v)_k$ potentially being occluded by an object in the scene or by the camera border. One specific way to achieve this is to choose two neighboring views $l_0$ and $l_1$ on opposite sides of camera view (k) and use the minimum of the depth difference $$C(z_k) \propto \frac{1}{\min(|z_k - z_{l0}|, |z_k - z_{l1}|)}$$

In some embodiments, the confidence value for a given depth value in a given depth map can be determined by evaluating the error resulting from projection the corresponding given depth position to another depth map and then projecting it back using the two depth values of the two depth maps.

Thus, the updater 203 may first project the given depth map position to another depth map based on the given depth value. The depth value at this projected position is then retrieved and the position in the other depth map is projected back to the original depth map based on this other depth value. This results in a test position which if the two depth values for the projections matched perfectly (e.g. taking the camera and capture properties and geometries into account) is exactly the same as the original depth map position. However, any noise or error will result in a difference between the two positions.

The updater 203 may accordingly proceed to determine a confidence value for the given depth map position in response to a distance between the given depth map position and the test position. The smaller the distance, the higher the confidence value may be, and thus the confidence value may be determined as a monotonically decreasing function of the distance. In many embodiments, a plurality of other depth maps, and thus distances, may be taken into account.

Thus, in some embodiments, confidence values may be determined based on the geometric consistency of motion vectors. Let $d_{kl}$ denote the 2D motion vector that takes a pixel $(u, v)_k$ given its depth $z_k$ to a neighbor view l. Each corresponding pixel location $(u, v)_l$ in the neighbor views l has its own depth $z_l$ which results in a vector $d_{lk}$ back to view k. In the ideal case, with zero error, all these vectors map back exactly to the original point $(u, v)_k$. However, in general, this is not the case and certainly not for less confident regions. A good measure for the lack of confidence is therefore the average error in back-projected position. This error metric may be formulated as:

$$C(z_k) \propto -\sum_{l \in L} \|(u, v)_k - f((u, v)_l; z_l)\|$$

where $f((u, v)_l; z_l)$ denotes the back-projected image coordinate in view k from neighbor view l using depth value $z_l$. The norm $\|\bullet\|$ may be the L1 or the L2 or any other norm. The confidence value may be determined as a monotonically decreasing function of this value. It will be appreciated that the term "candidate" does not imply any limit on the depth value and that the term candidate depth value may refer to any depth value that is included in the weighted combination.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. The terms "first", "second", "third" etc. are used as labels and as such do not imply any other restriction that to provide clear identification of the corresponding feature and should not be construed as limiting the scope of the claims in any way. Reference signs in the claims are provided merely as a clarifying example shall not be construed as limiting the scope of the claims in any way.

The invention claimed is:

1. A method of processing depth maps, the method comprising:
   receiving a plurality of images and corresponding depth maps, wherein the corresponding depth maps represent a scene from different view poses; and
   updating first depth values of a first depth map,
   wherein the first depth map is one of the corresponding depth maps,
   wherein the updating is based on depth values of at least a second depth map,
   wherein the second depth map is one of the corresponding depth maps,
   wherein the first depth map is for a first image and the second depth map is for a second image, the updating comprising:
      determining a first candidate depth value for a first depth pixel of the first depth map at a first depth map position in the first depth map, wherein the first candidate depth value is determined in response to at least one second depth value of a second depth pixel of the second depth map at a second depth map position in the second depth map; and
      determining a first depth value for the first depth pixel by a weighted combination of a plurality of candidate depth values for the first depth map position, wherein the weighted combination comprises the first candidate depth value weighted by a first weight, wherein determining the first depth value comprises:
         determining a first image position in the first image for the first depth map position;
         determining a third image position in a third image of the plurality of images, wherein the third image position corresponds to a projection of the first image position to the third image based on the first candidate depth value;
         determining a first match error indication indicative of a difference between an image pixel value in the third image for the third image position and an image pixel value in the first image for the first image position; and
         determining the first weight in response to the first match error indication.

2. The method of claim 1,
   wherein the determining of a first candidate depth value comprises determining the second depth map position relative to the first depth map position by a projection between a first view pose of the first image and a second view pose of the second image,
   wherein the first candidate depth value is based on at least one of a second value of the first depth map and a first original depth value of the first depth map.

3. The method of claim 1,
   wherein the weighted combination comprises candidate depth values determined from a region of the second depth map,
   wherein the weighted combination is based on the first depth map position.

4. The method of claim 3,
wherein the region of the second depth map is determined as a region around the second depth map position,
wherein the second depth map position is determined as depth map position in the second depth map equal to the first depth map position in the first depth map.

5. The method of claim 3,
wherein the region of the second depth map is determined as a region around a position in the second depth map,
wherein region of the second depth map determined by a projection from the first depth map position based on an original depth value in the first depth map at the first depth map position.

6. The method of claim 1, further comprising determining a second match error indication,
wherein the second match error indication is indicative of a difference between an image pixel value in the second image for the second depth map position and the image pixel value in the first image for the first depth map position,
wherein determining the first weight is in response to the second match error indication.

7. The method of claim 1, further comprising determining additional match error indications,
wherein the additional match error indications are indicative of differences between image pixel values in other images for depth map positions corresponding to the first depth map position and the image pixel value in the first image for the first depth map position,
wherein determining the first weight is in response to the additional match error indications.

8. The method of claim 1, wherein the weighted combination comprises depth values of the first depth map in a region around the first depth map position.

9. The method of claim 1, wherein the first weight is dependent on a confidence value of the first candidate depth value.

10. The method of claim 1, wherein only depth values of the first depth map are updated only when a confidence value is below a threshold.

11. The method of claim 1, further comprising selecting a set of depth values of the second depth map,
wherein the set of depth values of the second depth map comprise the weighted combination,
wherein at least one of-depth value of the set of depth values must have a confidence value above a threshold.

12. The method of claim 1, further comprising:
projecting a third depth map position for a third depth value in a third depth map to corresponding positions in at least two of the corresponding depth maps;
determining a variation measure for a set of depth values, wherein the set of depth values comprise the third depth value and depth values at the corresponding positions in the plurality of the corresponding depth maps; and
determining a confidence value for the third depth map position in response to the variation measure.

13. The method of claim 1, further comprising:
projecting a third depth map position for a third depth value in a third depth map to a corresponding position in fourth depth map, wherein the projection is based on the third depth value;
projecting the corresponding position in the fourth depth map to a test position in the third depth map, wherein the projection is based on a depth value at the corresponding position in the fourth depth map; and
determining a confidence value for the third depth map position in response to a distance between the third depth map position and the test position,
wherein the first weight is dependent on the confidence value.

14. An apparatus for processing depth maps, the apparatus comprising:
a receiver circuit, wherein the receiver circuit is arranged to receive a plurality of images and corresponding depth maps, wherein the corresponding depth maps represent a scene from different view poses; and
an updater circuit,
wherein the updater circuit is arranged to update depth values of a first depth map,
wherein the first depth map is one of the corresponding depth maps,
wherein the updating is based on depth values of at least a second depth map,
wherein the second depth map is one of the corresponding depth maps,
wherein the first depth map is for a first image and the second depth map is for a second image, the updating comprising:
determining a first candidate depth value for a first depth pixel of the first depth map at a first depth map position in the first depth map, the first candidate depth value is determined in response to at least one second depth value of a second depth pixel of the second depth map at a second depth map position in the second depth map; and
determining a first depth value for the first depth pixel by a weighted combination of a plurality of candidate depth values for the first depth map position, wherein the weighted combination comprises the first candidate depth value weighted by a first weight, wherein determining the first depth value comprises:
determining a first image position in the first image for the first depth map position;
determining a third image position in a third image of the plurality of images, wherein the third image position corresponds to a projection of the first image position to the third image based on the first candidate depth value;
determining a first match error indication indicative of a difference between an image pixel value in the third image for the third image position and an image pixel value in the first image for the first image position; and
determining the first weight in response to the first match error indication.

15. A computer program stored on a non-transitory medium, wherein the computer program when executed on a processor performs the method as claimed in claim 1.

16. The apparatus of claim 14,
wherein the determining of a first candidate depth value comprises determining the second depth map position relative to the first depth map position by a projection between a first view pose of the first image and a second view pose of the second image,
wherein the first candidate depth value is based on at least one of a second value of the first depth map and a first original depth value of the first depth map.

17. The apparatus of claim 14,
wherein the weighted combination comprises candidate depth values determined from a region of the second depth map, wherein the weighted combination is based on the first depth map position.

18. The apparatus of claim 17, wherein the region of the second depth map is determined as a region around the second depth map position, wherein the second depth map position is determined as depth map position in the second depth map equal to the first depth map position in the first depth map.

19. The apparatus of claim 17, wherein the region of the second depth map is determined as a region around a position in the second depth map, wherein region of the second depth map determined by a projection from the first depth map position based on an original depth value in the first depth map at the first depth map position.

20. The apparatus of claim 14, wherein the updater circuit is arranged to determine a second match error indication, wherein the second match error indication is indicative of a difference between an image pixel value in the second image for the second depth map position and the image pixel value in the first image for the first depth map position, wherein determining the first weight is in response to the second match error indication.

\* \* \* \* \*